Patented Aug. 8, 1933

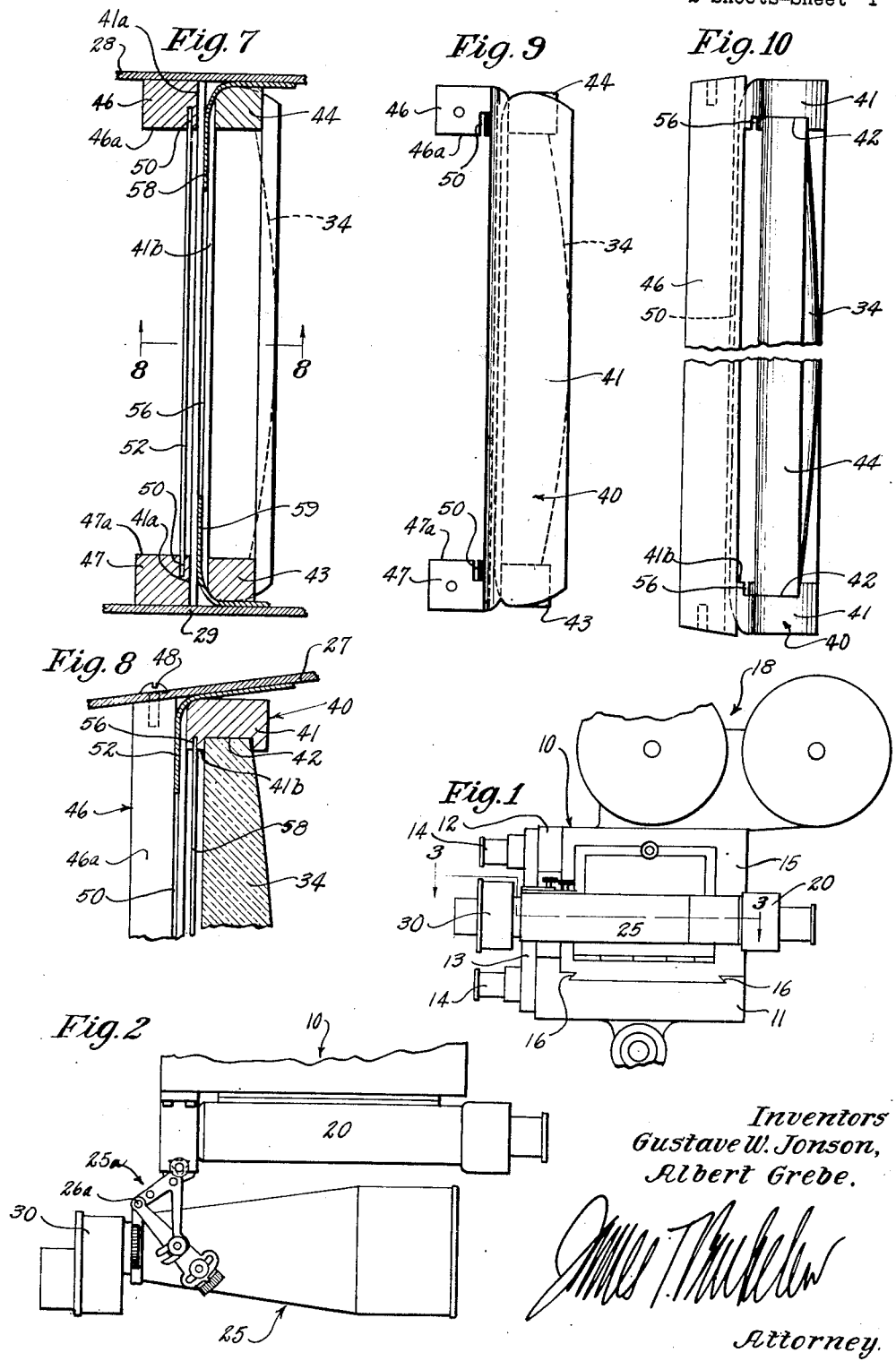

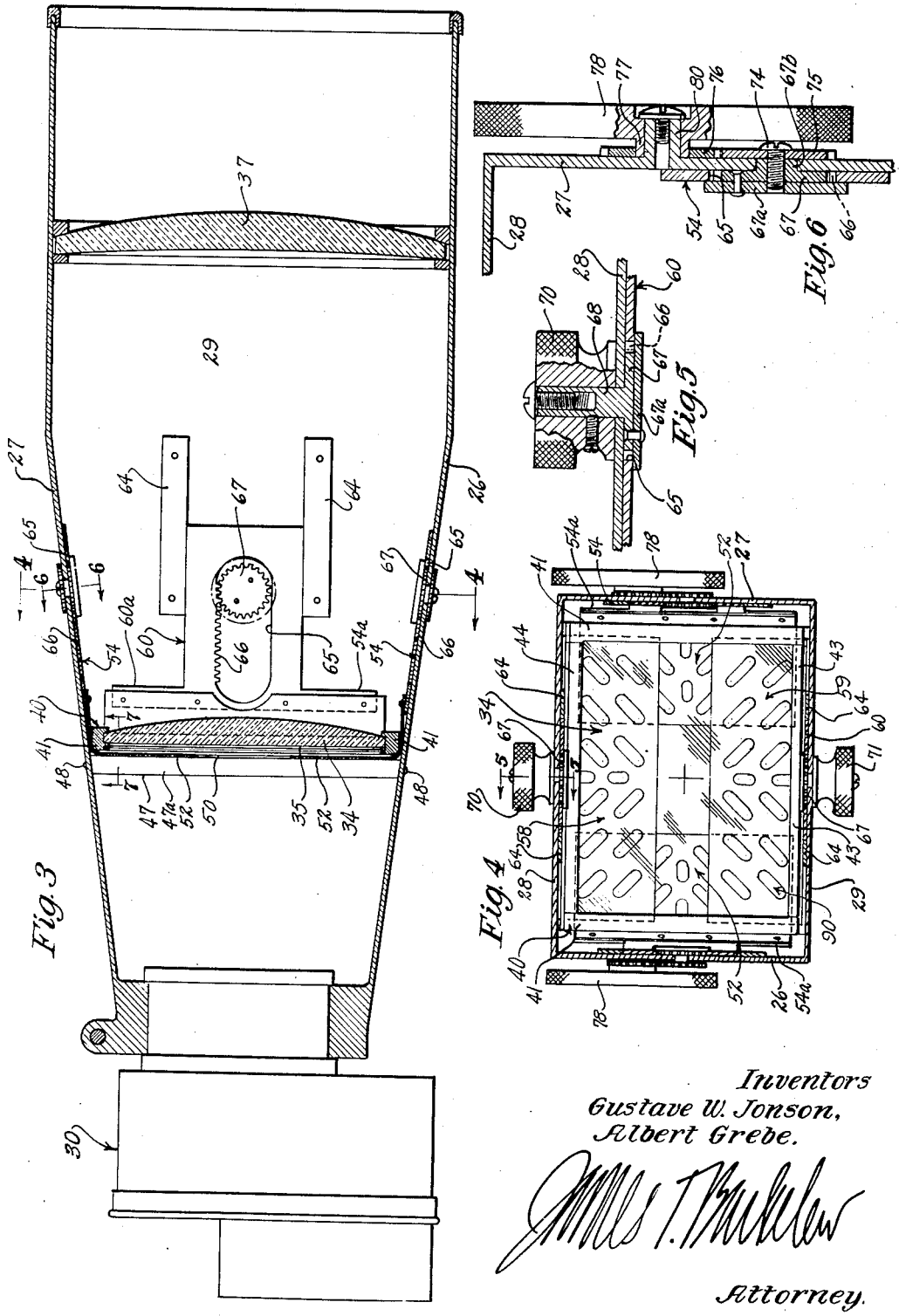

1,921,191

UNITED STATES PATENT OFFICE 1,921,191

ADJUSTABLE MAT FOR OPTICAL INSTRUMENTS

Gustave W. Jonson, Beverly Hills, and Albert Grebe, Los Angeles, Calif., assignors to Mitchell Camera Corporation, West Hollywood, Calif., a Corporation of Delaware Application June 9, 1931. Serial No. 543,120

6 Claims. (Cl. 88—1.5)

This invention has to do generally with adjustable mats for instruments such as motion picture cameras, or instruments used in association with cameras such as focusing or view finding devices. The invention is particularly adapted for use in the usual type of view finder used in connection with motion picture cameras and will therefore be herein illustrated and described in that connection, but without limitation thereto.

Motion picture cameras are ordinarily equipped with a number of photographic objectives of varying focal lengths, and since the field of view taken in by a lens depends upon its focal length, the field of view spread upon the film (or ground glass of the focusing instrument when said instrument is alined with the camera objective) varies with the focal length of the camera objective in use. Now it is desirable that the field of view framed within the view finding instrument correspond always to the field of view spread on the film by the photographic lens; but since the latter field changes with objectives of varying focal lengths, it is necessary, if such constant correspondence is to be achieved, to change the field of view within the view finder with each lens change in the camera.

To this end, instruments of this type have been uprovided in the past with four-way adjustable mats which, for instance, are slipped into position through slots in the side walls of the view finder casing. However, the view finder casing is ordinarily of a cross-sectional size not greatly larger than the largest image area to be framed and viewed therein, and such prior mats may therefore project outwardly through and beyond the sides of the casing to such a distance that they interfere with other parts of the camera. Moreover, such mats are inconvenient and difficult to adjust accurately.

Accordingly, it is among the objects of the present invention to provide a four-way mat arrangement for instruments such as view finders and other optical devices wherein the mats may be contained entirely within the instrument casing, even in situations in which the cross sectional side of the instrument is but just larger than the largest area to be framed by the mats.

It is a further object of the invention to provide a device of the character described, which is simple in construction and especially convenient to operate.

We have provided four-way mats which move in suitable guides transversely across the instrument to frame the aperture, as usual, but which are formed of flexible material and are flexed and turned at right angles and, in the present form of the invention, are guided along the inner surfaces of the side walls of the instrument casing instead of projecting out through the casing walls, as in prior practice. The mats are moved by slide members attached to these turned ends and slide operating means associated with the slides, and the mats slide easily in their guides along the casing side walls and through the right angle bends to move transversely across the instrument casing.

In using a view finder it is frequently desirable to know what is just outside the field of view of the camera objective, and it is another object of the invention to provide mats of such a nature that when the mats are in adjustment in the view finder, objects can be seen through the finder which are just outside the area framed therein by the mats. For this purpose we have provided the mats with preliminary viewing apertures, through which objects can be observed before they enter the field of view.

The invention itself will be more fully understood from the following detailed description of a present preferred embodiment thereof, reference for this purpose being had to the accompanying drawings, in which:

Fig. 1 is a side elevation of a conventional motion picture camera provided with a view finder;

Fig. 2 is a plan detail looking down on the view finder shown on the camera of Fig. 1;

Fig. 3 is a view, partly in section and partly in elevation, as taken on the broken line 3—3 of Fig. 1;

Fig. 4 is a transverse section taken on line 4—4 of Fig. 3;

Fig. 5 is a detail section taken on line 5—5 of Fig. 4;

Fig. 6 is a detail section taken on line 6—6 of Fig. 3;

Fig. 7 is a detailed section taken on line 7—7 of Fig. 3;

Fig. 8 is a detail section taken on line 8—8 of Fig. 7;

Fig. 9 is a side elevation of the framing device for the mat of the present invention; and Fig. 10 is a plan view of the device of Fig. 9.

It may here be stated that while we illustrate and describe the present invention in a specific embodiment as applied to a particular view finding device for a motion picture camera, no limitation on the invention is to be predicated by such typification since the invention has obvious wider application and use.

Referring now to the accompanying drawings, we illustrate at 10 a conventional motion picture camera comprising base 11, head 12 arising from the front end of said base and carrying lens turret 13 having a plurality of photographic objectives 14, camera box 15 supported on base 11 to the rear of head 12 and transversely slidable in ways 16, and film magazines 18 mounted on box 15. Within box 15 is the usual exposure aperture plate and intermittent mechanism for moving the film past said plate, these parts not being illustrated since they may be of any conventinal design. Before photographing a scene, lens turret 13 is rotated to bring the desired photographic objective 14 to photographing position. Box 15 is then moved transversely in ways 16 to bring a focusing device 20, carried by the side wall of the box, into alinement with the selected objective. The objective may then be accurately focused on the scene.

At this time the view finding device may be alined with the scene. The view finder, indicated generally at 25, is carried at the side of the camera, outside of focusing device 20, as on a bracket 25a, and this bracket may have provisions for swinging the view finder in a horizontal plane, as on a pivot 26a, to aline the finder with the scene, or in other words to adjust for parallax. A preferred view finder mounting, herein illustrated, is disclosed and claimed in Patent No. 1,800,225, issued to G. A. Mitchell.

Assuming camera box 15 still in position with the focusing device alined with the photographic objective, then to bring the view finding device into alinement with the field of the photographic objective, the usual procedure is to aline a cross-hair in the photographic objective or focusing device with some object in the scene to be photographed, and then to swing the view finder to bring its cross-hair into coincidence with the same object. At this time it is convenient to adjust the view finder mats to vary the field of view framed within the view finding device until said field corresponds to the field framed within the focusing device, the means according to the present invention for accomplishing this purpose, however, being described at a later point in the specification. After the objective is focused and the finder is adjusted, the camera box is returned to its initial position to bring the aperture plate and film back and into alinement with the objective. When this is accomplished, the field of view then spread on the film is framed within the view finder.

The view finder proper comprises a casing forming a light conduit and made up of vertical side walls 26 and 27 and top and bottom walls 28 and 29, respectively, the casing being rectangular in cross-section (see Fig. 4), and its side walls diverging rearwardly, as clearly shown in Fig. 3. In the forward reduced end of the casing is carried the mounting 30 for the finder casing objective combination, not shown. This objective combination, which is adjustably mounted for focusing on the scene to be photographed, is preferably an erecting combination giving an image which is right side up and correct as for right and left, such a combination being described in Patent No. Re. 17,995, entitled "Erecting finder". Mounted to the rear of the objective combination in the divergent section of the finder casing, and located properly with respect to the focal plane of the objective combination, is a glass 34 having a suitable image receiving surface 35 on its forward side, surface 35 being at the focal plane of the objective. This image receiving surface 35 may, for instance, be a ground glass surface. Glass 34, which is rectangular in configuration, is preferably a plano-convex lens, its forward plane surface being ground as mentioned, and its rearward surface being slightly convex so that the lens acts as a light collector. It may here be stated that, in the present form of the invention, the framing of the field of view within the view finder is accomplished directly in front of ground glass surface 35, as will be more fully described in the following paragraphs. To the rear of lens 34 there may be another collecting lens 37, as shown in Fig. 3.

Lens 34 is mounted in a frame 40 comprising upright members 41 having grooves 42 within which the vertical edges of the lens are received (Figs. 3 and 8), a horizontal lower member 43 supporting the lower edge of the lens and secured, as by welding, between the lower ends of members 41, and a horizontal upper member 44 frictionally held between the upper ends of members 41. Upright members 41, which are slightly spaced from the side walls of the casing to provide for passage of the later described mats (Figs. 3 and 8), are secured top and bottom at their forwardly facing surfaces 41a to upper and lower horizontal members 46 and 47, respectively, the ends of said members 46 and 47 engaging the side walls 26 and 27 of the casing and being secured thereto as by screws 48. The upper and lower surfaces of members 46 and 47, respectively, engage the inner surfaces of the casing walls, while the upper and lower lens frame members 44 and 43, respectively, are spaced a short distance from the casing walls to provide for the later described mats, as were the upright frame members 41, all as clearly shown in Figs. 7 and 8.

The inwardly facing surfaces 46a and 47a of horizontal members 46 and 47, respectively, are formed with opposed grooves 50 providing a horizontal way for a pair of flexible, rectangular, side mats 52. These side mats, which may be of thin flexible metal, or any other suitable flexible material, curve from the ends of grooves 50 around the outer edges of uprights 41 and extend rearwardly outside said uprights along the inner surfaces of the casing side walls. The mats are individually operable to slide in grooves or ways 50 for the purpose of adjusting the side or vertical edges of the field of view in front of the ground glass by forward or rearward movement of rearwardly extending slide members or plates 54 affixed thereto, as later to be described in more detail. Plates 54 are preferably formed with extensions or strips 54a to which the mats are fastened, as by riveting, said extensions serving to brace the transverse edges of the rear ends of the mats.

The inwardly facing surfaces 41b of upright frame members 41 are formed, just forwardly of lens 34, with grooves 56 providing a vertical way for flexible upper and lower mats 58 and 59, respectively, it being noted that said grooves 56 are in a plane back of the side mats, so that the upper and lower mats may overlap the side mats. These upper and lower mats, which may be substantially of the same nature as the side mats, curve from the ends of grooves 56 around the outer edges of horizontal upper and lower frame members 44 and 43, respectively, and extend rearwardly along the inner surfaces of the respective upper and lower walls of the casing, their rearward ends being provided with rearwardly extending slide members or plates 60, which are individually movable forwardly or rearwardly to cause the mats to slide vertically in grooves 56 for the purpose of framing the horizontal edges of the field of view before the ground glass. Plates 60 are preferably formed with lateral extensions 60a, bracing the transverse edges of the rear ends of the mats.

It will now be understood that forward or rearward movement of the rearwardly extending slide members attached to the flexible mats causes the mats to flex and slide around the edges of the lens frame and through the transverse ways in front of the ground glass to adjust the positions of the four edges of the aperture or field of view at the ground glass. The mats, although flexible, possess sufficient stiffness to stand in the positions described and to be pushed forward by force applied at their rear edges.

Means now to be described are provided for individually operating the slide plates attached to the mats, so that the several mats are adjustable individually. While any suitable means for operating the plates may be utilized, we employ for each plate a gear meshing with a rack on the plate and operable by a knob projecting from the casing. Thus the plates, which slide between guide strips 64 (see Figs. 3 and 4), are each provided with a longitudinally extending slot 65 having along one of its longitudinal edges rack teeth 66, as clearly shown in Fig. 3. Within slot 65 and meshing with rack 66 is a gear 67 which is mounted on a stud journalled in the wall of the casing.

Considering first the plate 60 of the upper mat, and referring to Fig. 5, it will be seen that the gear 67 for this plate is on the end of a stud 68 journalled in upper casing wall 28 and having set on its exterior end an operating knob 70. Secured to the inner surface of gear 67 is a disk 67a of larger diameter than the width of slot 65, said disk holding the mat plate in proper position against the wall of the casing and in mesh with gear 67. In a similar manner, the gear 67 driving the plate 60 of the lower mat is operated by a knob 71 below the lower wall 29 of the casing.

The gear 67 driving the plate 54 of each side mat is formed with a hub 67b journalled in the casing side wall, and said gear is secured, as by screw 74, to a gear 75 adjacent the outer surface of the casing wall, as clearly shown in Fig. 6. Gear 75 meshes with a gear 76 which is set on a sleeve or hub 77 of an operating knob or disk 78, disk 78 and its sleeve 77 being mounted for rotation on a boss 80 extending from the casing side wall. It will be apparent that rotation of disk 78 operates gears 76 and 75 to drive the gear 67 meshing with rack 66 to move the mat operating plate 54. Disk 78 is preferably of sufficient diameter to project above the upper surface of the casing for convenience of operation, as clearly shown in the drawings.

Thus by rotation of the mat operating knobs or disks the mats may be moved back and forth across the ground glass of the view finder, and by comparison with the field of view of the camera objective as observed through the focusing device, the field of view of the view finder may be brought easily and quickly into coincidence therewith.

In using the view finder it is frequently desirable to know just what is outside the field of view of the camera objective, as for instance when it is desired to move the camera during its operation to take in an object originally outside the field of view, or when it is desired to know at what instant a moving object will come into the field of the camera. For this reason we have made the mats partially transmissive of light, preferably by forming them with a plurality of preliminary viewing apertures, such as indicated at 90. With such provisions the field of view of the instrument is still sharply defined by the inner edges of the mats, but it is possible to locate objects outside the field of view by looking through said apertures.

It will be understood the drawings and description are to be considered merely as illustrative of and not restrictive on the broader claims appended hereto, for various changes in design, structure and arrangement may be made without departing from the spirit and scope of said claims.

We claim:

1. In an optical device having a casing defining a light conduit in which an image is formed in a focal plane which is transverse of the casing, a flexible mat, means in the casing for guiding the mat in the focal plane and in a plane along the casing wall, a slide member sliding in the last mentioned plane and attached to the part of the mat in that plane, and means associated with said slide member by which the slide member may be moved back and forth manually.

2. In an optical device having a casing of rectangular crosss section defining a light conduit in which an image is formed in a focal plane transverse of the casing, four flexible mats, means in the casing for guiding said flexible mats in said focal plane and in planes along the walls of said casing, one along each wall, slide members in the last mentioned planes attached to the mat portions in said planes, and means associated with each slide member by which said slide members may be moved back and forth manually.

3. In an optical device having a casing defining a light conduit in which an image is formed in a focal plane which is transverse of the casing, a flexible mat, means in the casing for guiding the mat in the focal plane and in a plane along the casing wall, a slide member sliding in the last mentioned plane and attached to the part of the mat in that plane, rack gear teeth on said slide member, and a pinion gear meshing therewith and mounted on the casing side wall.

4. In an optical device having a casing of rectangular cross section defining a light conduit in which an image is formed in a focal plane transverse of the casing, four flexible mats, means in the casing for guiding said flexible mats in said focal plane and in planes along the walls of said casing, one along each wall, slide members in the last mentioned planes attached to the mat portions in said planes, rack gear teeth on each of said slide members, and pinion gears mounted one on each of the four side walls of the casing and meshing with the rack teeth on corresponding slide members.

5. In an optical device having a casing of rectangular cross section defining a light conduit in which an image is formed in a focal plane transverse of the casing, a plurality of flexible mats mounted in the casing to slide from the side walls of the casing in said focal plane to define a view area therebetween, said mats having straight view area defining edges, and being partially light transmissive back of said edges to permit viewing therethrough outside the view area defined by said edges.

6. In an optical device having a casing of rectangular cross section defining a light conduit in which an image is formed in a focal plane transverse of the casing, a plurality of flexible mats mounted in the casing to slide from the side walls of the casing in said focal plane to define a view area therebetween, said mats having straight view area defining edges, and being spacedly perforated back of said edges to permit viewing therethrough outside the view area defined by said edges.

GUSTAVE W. JONSON.
ALBERT GREBE.